United States Patent

[11] 3,620,484

| [72] | Inventor | Fritz Schoppe<br>Max-Ruttgers-Str. 24, 8026<br>Ebenhausen/Isartal, Munich, Germany |
|---|---|---|
| [21] | Appl. No. | 792,006 |
| [22] | Filed | Jan. 17, 1969 |
| [45] | Patented | Nov. 16, 1971 |
| [32] | Priority | Feb. 14, 1968 |
| [33] | | Austria |
| [31] | | A 1405/68 |

[54] METHOD AND STRUCTURE FOR REDUCTION OF SHOCK WAVES
8 Claims, 5 Drawing Figs.

[52] U.S. Cl. .................................................. 244/1 N, 244/130
[51] Int. Cl. ......................................................... B64c 23/04
[50] Field of Search ........................................... 244/1, 130, 35, 35.6, 62; 60/270

[56] References Cited
UNITED STATES PATENTS

| 2,949,550 | 8/1960 | Brown .......................... | 244/62 X |
| 2,995,317 | 8/1961 | Schoppe ....................... | 60/270 X |
| 3,028,129 | 4/1962 | Faillie ........................... | 244/130 X |
| 3,259,065 | 7/1966 | Ross et al ...................... | 244/130 X |
| 3,446,464 | 5/1969 | Donald .......................... | 244/130 |

FOREIGN PATENTS

| 635,784 | 4/1950 | Great Britain ................ | 244/42 (.49) |

*Primary Examiner*—Milton Buchler
*Assistant Examiner*—Jeffrey L. Forman
*Attorney*—Strauch, Nolan, Neale, Nies & Kurz ABSTRACT: A method of and apparatus for reducing shock waves created by solid bodies having supersonic speed relative to a gas, and reducing and even eliminating the sonic boom which accompanies the shock waves. The nose or leading portion of the moving body, be it a body of revolution, or an airfoil lifting body, or be it another moving body, is provided with blunt configuration at its leading portion to create a detached "normal" shock wave. A three-step thermodynamic cycle is applied to the gas (i.e., air) flow surrounding the moving body. The three steps are (1) compression of the gas, caused by the moving body, (2) heating of the compressed gas by addition of heat, and (3) expansion of the compressed gas to hear its original pressure. In air, for example, a blunt nose flying body at supersonic speeds creates a high compression zone (stagnation zone) between the shock wave and the nose of the body. Heat is applied, e.g., by burning fuel, electricity, or nuclear radiation, to the stagnation zone of high pressure, resulting in a substantial decrease of static pressure immediately in front of the blunt nose. The heat can be applied to the compressed air zone from forwardly projecting structures suitably shaped to create only low intensity shock waves. The applied heat decreases the static pressure at the nose zone, in turn decreasing the high air drag, and also decreasing the intensity of the shock wave ahead of the flying body, thereby decreasing the intensity of the part of the shock wave which reaches the ground, resulting in a reduction in sonic boom.

PATENTED NOV 16 1971    3,620,484

INVENTOR.
FRITZ SCHOPPE
BY
Strauch, Nolan, Neale, Nies & Kurz
ATTORNEYS

METHOD AND STRUCTURE FOR REDUCTION OF SHOCK WAVES

BACKGROUND OF THE INVENTION

Although the present invention is applicable generally to solid bodies having supersonic speeds relative to gases, it will be discussed relative to flying bodies in air, e.g., atmosphere. When a flying body moves with supersonic speed through the atmosphere, it is well known that a shock wave is created right in front of the flying body. The shock waves continue down to the surface of the earth where they can be heard as sonic booms. The sonic booms are becoming increasingly annoying, particularly around populated areas, and in some cases they damage property, hence it is now highly desirable to find ways to reduce or remove the sonic boom. It is here noted that a pointed nose configuration for flying bodies is generally accepted as the optimum one for supersonic flight. The acceptance of such configuration is because as long as the wedge or cone angle of such nose is less than a critical angle, the developed shock wave will be an "oblique" wave attached to the point of the nose, and pressure rise behind the wave and drag will be minimized. It is also known that blunt-nosed bodies, which includes those with squared noses, rounded noses, and noses with angles of divergence greater than the critical angle, create a detached shock wave with a front portion perpendicular to the upstream airflow trailing into an oblique shock wave. The detached substantially perpendicular front portions of such shock waves are termed normal shock waves, and static pressure behind the normal wave, as well as drag on the body, increases greatly. As a result of the aforedescribed knowledge, most successful supersonic bodies are made with sharp nose configurations and hence do not create a stagnation zone (zone behind a normal shock wave). Hence, investigations on reducing or eliminating the sonic boom, which is occurring in conjunction with successful supersonic bodies, start with structural configurations and shock wave conditions which are not conducive to practicing the present invention.

The present invention pertains to a novel method of and structure for reduction of shock waves created by bodies flying with supersonic speeds in air and any gas. The invention will be explained by using as an example, a flying body in flight with supersonic speed through air, although it will be understood, the invention is not limited to such example. The invention can be applied to all other solid bodies that have supersonic speed relative to a gas, for instance, the vanes of gas turbines and compressors, etc.

According to this invention, the reduction of the sonic boom is effectuated by using a thermodynamic cycle and applying it to the airflow that surrounds the flying body. The thermodynamic cycle consists of three steps. The first step is the compression conception of the air, the second step, the heating of the air, and the third step, its expansion to about the original pressure. The result is substantial reduction and perhaps elimination of the heavy shock wave generated by the flying body moving at supersonic speeds.

SUMMARY OF THE INVENTION

Accordingly, a primary object of this invention resides in the provision of a novel method of reducing shock waves and the resultant sonic booms generated by solid bodies at supersonic speeds.

A further object resides in provision of a novel method of reducing shock waves generated by supersonic bodies which utilizes an efficient, three-step thermodynamic cycle consisting of highly compressing the air or gases surrounding the nose of the supersonic body and applying heat to the compressed air or gases to expand those gases to or near their original pressures. In conjunction with this object further objects reside in (1) applying heat in an unsymmetrical pattern in the area of compressed gases adjacent the nose of the supersonic body; (2) utilizing burning fuel to apply the heat (3) having a means of holding the flame within the zone of high compression; and (4) said flame-holding means can be a shock wave pattern or a body of displacement disposed forward of the nose of the flying body. The means of applying heat can, for example, be by burning of fuel, by electricity, or by radiation such as from a nuclear source.

Further objects reside in the provision of a novel blunt nose supersonic body having means forward of the blunt nose for applying heat to the zone immediately in front of and surrounding the nose surface, the blunt nose body being capable of supersonic speed relative to surrounding gases with substantial reduction of nose shock wave generation while heat is being applied forward of the nose during supersonic speed. In conjunction with the foregoing object, further objects reside in provision of novel blunt nose structures capable of efficient subsonic flight and having provision for utilizing the resultant high compression adjacent the nose of such bodies in supersonic flight to accomplish a three-step thermodynamic cycle of compression, heating and expansion of the air adjacent the nose to reduce the shock wave and high air drag normally occasioned by the shock wave generated by a blunt nose body. By utilizing selective unsymmetrical application of the heat, selective use of perpendicular forces on the supersonic flying body can be used to control the flight path.

BRIEF DESCRIPTION OF DRAWINGS

Further novel features and other objects of this invention will become apparent from the following detailed description, discussion and the appended claims taken in conjunction with the accompanying drawings made from photographs of tunnel tests on a model having exemplary structure by which the method of the invention can be realized, in which:

FIGS. 1, 2, and 3 were reproduced from "Schlieren" photographs;

FIG. 1 shows a cylindrical body with a forwardly protruding gas pipe (no gas flow) terminating in a nozzle and having an electric arc igniting device;

FIG. 2 illustrates the same body as in FIG. 1 excepting that gas is flowing from nozzle holes near the end of the gas pipe causing a change in the shock wave pattern;

FIG. 3 illustrates the next stage of the same test as in FIGS. 1 and 2, wherein the gas has been ignited and is burning; FIG. 4 illustrates substantially the same conditions as shown in FIG. 3, but was reproduced from an ordinary photograph in which the luminescent envelope of burning gases can be seen diverging from the gas pipe nozzle end, surrounding the blunt nose of the test body, and providing a thin layer of hot gases passing back adjacent to the body walls.

SPECIFIC DESCRIPTION

Figure 1:
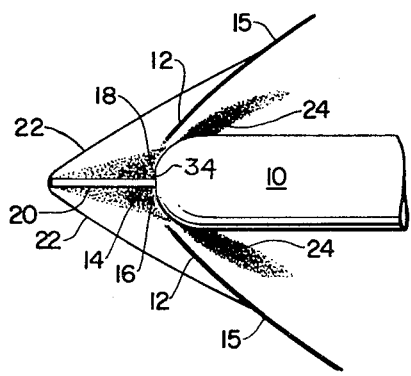
FIGS. 1–4 are drawing reproductions of photographs, taken of a blunt nose test body in a supersonic tunnel, tunnel speed being Mach 2.25.

The drawings represent a rather simple arrangement of a cylindrical body 10 with a rounded, essentially hemispherical nose, and a small diameter protruding gas tube and nozzle. The test body had a diameter of 40 mm. The drawings represent one structure in accord with the structural invention, by which the inventive method can be accomplished. The disclosed structure is not intended to restrict the overall form or shape of structure by which the invention can be realized inasmuch as it is applicable to many other elements, such as wings, vanes, and blades subject to supersonic speeds.

As briefly stated hereinbefore, the reduction of the shock wave, drag and sonic boom utilizes a thermodynamic cycle, applying it to the airflow that surrounds the flying body, and the cycle consists of three steps, compression of the air, adding heat to the air, and accomplishing expansion of the compressed air to about the original pressure.

When carrying out such a process, mechanical energy will be delivered if conditions are such that the unavoidable losses of compression and expansion do not exceed the mechanical useful energy. If there remains an excess of produced mechanical useful energy over the losses, this excess consists of an acceleration of the airflow that surrounds the flying body. According to the law of conservation of momentum, a force corresponding to the acceleration of the airflow acts on any surrounding of this airflow. Since the only available surrounding of this airflow is the flying body itself, this reaction force has to act on the flying body itself, and must accelerate the flying body in the direction of flight against the direction in which airflow accelerates.

At supersonic speeds, the most important part of the air drag is formed by positive pressures along the nose of the flying body. If any force acts on the flying body, it must show itself by a change in the distribution of static pressures of the air around the flying body. Since, as mentioned, the main source of air drag is the positive pressures around the nose of the flying body, those pressures have to be reduced according to the said reaction.

Now, when considering supersonic speeds, the intensity of a shock wave in front of the flying body is represented by the positive pressure around the nose of the body. If, as has been mentioned, the positive pressures (or stagnation pressure) are reduced, the shock wave has to be reduced accordingly. If the shock wave in front of the flying body is reduced, the part of the shock wave which arrives on the ground has to be reduced greatly accordingly. This means that the sonic boom will be reduced.

To carry out the thermodynamic cycle according to the invention, the airflow that arrives at the flying body has to be compressed. After its compression, this airflow has to be heated. As for the heating process, it is of utmost importance to carry out the combustion within a very limited space in which the stagnation pressures are sufficiently high.

Applicant's tests in the supersonic range have shown an essential reduction of the static pressures in the zone of the nose of the flying body. Accordingly, the air speed after the flying body has been increased, the changes of the pressure distribution at the nose of the flying body correspond remarkably well with the increase of momentum of the airflow after the flying body.

Applicant's tests were undertaken knowing there was a premise as to whether the effect of reducing the air drag could take place at supersonic speeds, inasmuch as test results have been previously published where the opposite took place. In those tests, flying bodies with long sharp-edge noses had been used, of which the surface had been heated by electric means. As for those previously known results, a remarkable increase of the air drag has been observed. The explanation for this effect is that the heating of the airflow around the nose cone acted in the same way as an increase of the nose cone angle, which, in turn, caused an increase of the static pressure and thus of the air drag of the flying body.

The thermodynamic explanation for these previously realized results lies in the fact that with slim flying bodies having a sharp-edged nose cone, the compression of the air is so small that the compression losses as caused by the shock wave exceeded by far the production of useful mechanical energy.

Against all expectation, in view of the aforedescribed results with the accepted sharp nose supersonic bodies, the application of this invention through proper means resulted in the surprising effect of reduction of the air drag. In efficiently accomplishing this purpose, it was found necessary to follow strictly the rules of thermodynamic cycles, meaning that high compression of the air to be heated is necessary in order to obtain a high thermal efficiency of this thermodynamic cycle. It is well known that the efficiency of a thermodynamic cycle increases if the compression ratio is increased, disregarding the fact that an increase of the compression ratio increases the energy consumption to carry out this compression.

When applied to the present case of a flying body, this requires the occurrence of high compression of the air that arrives at the flying body. If no combustion takes place the consequence is, of course, higher air drag than with a slender, sharp-pointed body or sharp edge air foils, as used today with supersonic speed.

The necessary compression can be effectuated by using a blunt-nosed body such as the body 10 in the drawings, which is representative of an aircraft fuselage nose or the rounded nose of an air foil section, such as used for subsonic aircraft air foils.

In this case, a strong shock wave 12 will be formed which, as a consequence of the law of conservation of mass, forms a normal or perpendicular shock wave 14 a certain distance in front of the flying body. It is well known that the perpendicular shock wave portion 14 in front of the blunt nose flying body 10 is declined into a conical form of shock wave 15 which surrounds the body 10. Between the perpendicular part of the shock wave 12 and the front part 16 of the body, there is a zone 18 where the speed is subsonic. When surrounding the flying body, airflow at this subsonic speed will be accelerated again to supersonic speed as is the other surrounding airflow. By doing so, the speed will have to pass the speed of sound, the so-called "sonic line." A close look shows that, even at supersonic speed of this blunt nose body, certain fields or stagnation zones of subsonic speeds exist surrounded by the front part of the shock wave and the sonic line surface of the blunt nose itself.

Figure 5:
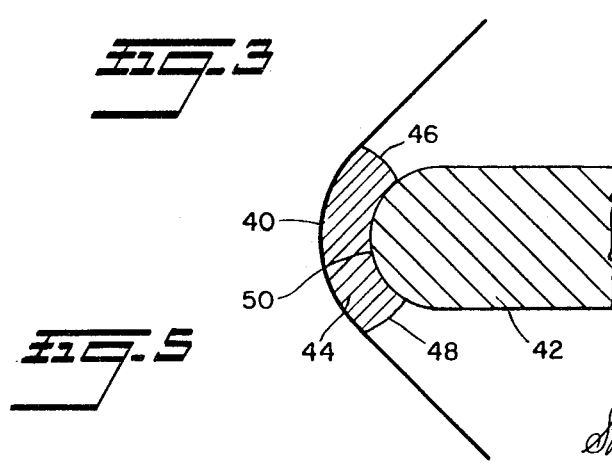
FIG. 5 is a sketch representing a blunt nose portion moving at supersonic speed relative to surrounding gas, and shows an exaggerated detachment of a shock wave in front of the blunt nose with the stagnation zone between the nose surface and the shock wave and bounded by the sonic line.

FIG. 5, which illustrates the stagnation zone, depicts a detached shock wave 40 displaced an exaggerated distance ahead of the blunt-nosed body 42 at supersonic speed to clearly show the high pressure stagnation or subsonic zone 44 in which the gas is heated. The two lines 46 and 48 represent the transition from subsonic flow to supersonic conditions of the surrounding gas as the gas passes from the stagnation zone, between the detached shock wave 40 and the blunt nose surface 50 of the body 42, back past the nose surface. The transition represented by lines 46 and 48 is termed the sonic line.

The distance between the part of the shock wave in front of the flying body and the surface of this body can be increased by a special means, for instance, by bodies of displacement or mechanical flame holders, similar to the flame holders disclosed in conjunction with the statojet engine bodies in applicant's U.S. Pat. No. 2,995,317.

The speeds of airflow within this stagnation zone or subsonic zone 18 or 44 are the lowest, and, as a consequence, the static pressure in this field is the highest value. When added heat is applied, as by burning fuel within this field, the thermal efficiency of the combustion forces will arrive at its maximum.

Following the aforedescribed theories, initial tests with simple flame holders showed that upon application of heat, one will obtain a remarkable decrease of the static pressure and, accordingly, of the air drag of the body. Now if the static pressures at the nose zone 18 of the body are decreased, the intensity of the shock wave in front of the flying body will in turn be decreased. And if the perpendicular part 14 of the shock wave in front of the flying body is decreased, the conical part of the shock wave that arrives at the ground has to be decreased accordingly. This has been shown by initial tests at supersonic speeds, and therefore the desired effect of this invention has been achieved.

As mentioned, combustion has to be carried out in a very small area in which sufficiently high static pressure exists. In order to do so, it will be necessary to apply means to prepare the fuel, to mix it with the arriving air and to stabilize the flame. This can be achieved, as is well known, by using usual flame holders within the area of increased static pressure in front of the nose of the flying body.

Figure 2:
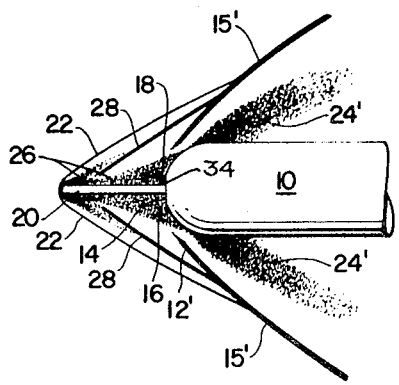

Another possibility, and one which was actually utilized in the tests, is to use a shock wave itself as a flame holder. In this case, it is possible to use just a small body of displacement, e.g., the small diameter gas tube or pipe 20 protruding in front of the body 10 and the nose end of the small body generates relatively low shock waves 22 used as a flame holder. If no combustion occurs, as is depicted in FIGS. 1 and 2, the head end 16 of the main body would generate an additional very strong shock wave 12 in its usual manner. The mentioned low shock wave 22 arrives then on this strong shock wave 12 and adds itself to it. But when carrying out combustion forces within the said area of increased static pressure, the strong shock wave from the nose of the flying body 10, as shown by Schlieren photographs, disappears completely. Only the shock wave 22 of the first small body of displacement (the gas tube 20) in front of the flying body 10 remains and it has a very low intensity. By making the shock wave 12 of the head of the flying body itself disappear, the effect of this invention is achieved.

Turning now to the drawings with more specificity, test speed in all stages of test represented by the views was Mach 2.25, and the gas forced through tube 20 was hydrogen. FIG. 1 illustrates the airflow pattern when no gas is passing from tube 20. The thin shock wave 22 caused by the end of the small pipe 20 joins into the strong shock wave 12 caused by the body 10. Darker shadows 24 diverting back from the shoulders of body 10 indicate density gradients around the body.

FIG. 2 depicts the same test conditions as does FIG. 1 except that hydrogen gas 26 (unlit) is flowing from holes adjacent the end of gas pipe at 2.18 gr./sec. Due to the deplacement effect of the relatively small gas flow (unlit), the shock wave 12' (15') of the body has become stronger. Note the light shock wave 22 from the nose of pipe 20 remains and an additional light shock wave 28 originates from adjacent the gas holes near the end of the pipe 20. The black shadows 24' around the body 10 are substantially increased.

Figure 3:
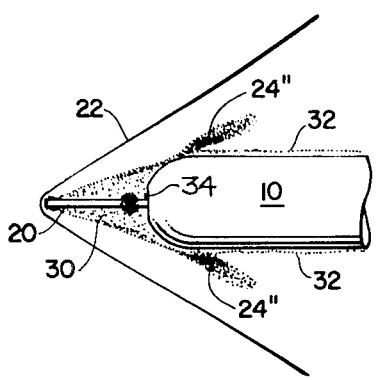

The "Schlieren" picture depicted by FIG. 3 illustrates the same test but the hydrogen gas flow has been ignited, is burning in the cone 30 and hot gases 32 stream back along the body 10. Ignition is accomplished by an electric arc or spark plug device 34. The body shock wave has disappeared and only the light or soft shock wave 22 caused by the nose of pipe 20 remains. The black shadows 24" around the body shoulders are materially reduced indicating that the differences of density around the body have been reduced accordingly. The body 10 can be said to be flying in its own "subsonic field."

Figure 4:
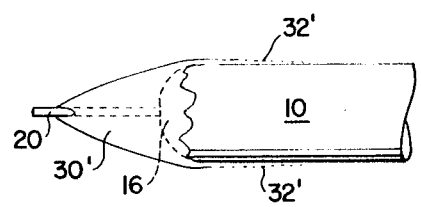

FIG. 4 represents a drawing of an ordinary photograph of the test body 10 under essentially the same conditions as that which is represented by FIG. 3. The gas flow was only slightly higher, i.e., 2.21 gr./sec., and test speed was still Mach 2.25. This picture shows burning gases 30' in a cone ahead of and substantially enveloping the nose 16. A slight luminescence 32' appears in an envelope of hot gas passing back around the body 10.

By carrying out unsymmetrical combustion processes in front of the flying body, additional forces perpendicular to the main flight direction can be applied. In other words, by confining the heat to one segment, say the lower half of the nose, the nose will move down. The idea of this invention is not limited to flying bodies but can be used everywhere where solid bodies have a supersonic speed relative to a gas. The individual steps of this method can be essential for this invention.

This method is not limited to the heating of air by using usual fuels. As for instance, the heating can be achieved by radiation of electrical or atomic energy.

Furthermore, it is well known that the air drag of flame holders depend on the fact whether a flame forms itself behind the flame holder or not, for the combustion causes an increase of volume and accordingly an increase of stagnation effect. Under certain conditions, it is well known, configuration of flame holders in front of the flying body can be found that the flame holder in case of no combustion form only a very soft shock wave while the main airflow penetrates the area of flame holder without any remarkable air drag.

But when applying combustion to low shock flame holders the volume increase can go so far that the whole cross section at supersonic speeds can be blocked, thus increasing the compression of the air remarkably, and forming a perpendicular shock wave in front of the flame holders or next to them. This, in turn, causes an additional increase of the efficiency and performance of the thermodynamic cycle.

What is claimed and desired to be secured by Letters Patent is:

1. A method for reducing the intensity of sonic waves on blunt-nosed solid bodies with supersonic speeds relative to a gas, characterized by heating a zone of said gas substantially confined to subsonic flow, said zone being limited by the surface of the nose of said supersonic body, the sonic lines and the shock wave in front of the nose.

2. A method according to claim 1, characterized in that the said gas consists of air; and burning fuel is applied to said zone.

3. A method according to claim 2, characterized by using at least one flame holder located in front of the supersonic body to accomplish stabilization of the combustion of said burning fuel.

4. A method according to claim 3 characterized by use of a shock wave as a flame holder.

5. A method according to claim 3 characterized by the fact that a small body of displacement is disposed in front of the supersonic body and a shock wave of less intensity than that of the supersonic body itself without combustion is generated by said small body, and where the shock wave of said small body of displacement is used as the flame holder.

6. A method according to claim 1 characterized by the fact that said gases are heated in unsymmetrical areas next to the nose to generate forces perpendicular to the main flight direction of movement of the body relative to surrounding gases.

7. A method according to claim 1 characterized by the use of flame holders in front of the supersonic bodies and said flame holders are arranged so that, in case of no combustion, they themselves generate only a small air drag while the combustion effect increases the air drag of the flame holders.

8. A method for reducing shock waves created by solid bodies having supersonic speed relative to a gas utilizing application of a thermodynamic cycle to the gas flow surrounding the body comprising: compression of the gas by means of using a blunt nose on the body and moving the body at supersonic speed; heating the compressed gas substantially within a zone of subsonic flow by ejecting fuel starting at a position spaced ahead of the blunt nose of the body and burning said fuel substantially in a zone limited by the surface of the nose of the supersonic body, the sonic lines and the shock wave in front of the nose; and expansion of the compressed gas to pressures near their original pressures.

* * * * *